United States Patent
Wang et al.

(10) Patent No.: US 7,934,007 B2
(45) Date of Patent: Apr. 26, 2011

(54) SERVER SIDE TFTP FLOW CONTROL

(75) Inventors: Zhi Wang, Shanghai (CN); Rui Jian, Shanghai (CN); Ying'an Deng, Shanghai (CN); Yuanhao Sun, Shanghai (CN); Caidong Song, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 780 days.

(21) Appl. No.: 10/574,293

(22) PCT Filed: Mar. 5, 2005

(86) PCT No.: PCT/CN2005/000263
§ 371 (c)(1),
(2), (4) Date: Mar. 31, 2006

(87) PCT Pub. No.: WO2006/094426
PCT Pub. Date: Sep. 14, 2006

(65) Prior Publication Data
US 2008/0250155 A1 Oct. 9, 2008

(51) Int. Cl.
*G06F 15/16* (2006.01)
(52) U.S. Cl. .................. 709/230; 709/232; 709/238
(58) Field of Classification Search .......... 709/203, 709/250, 217–219, 223–224, 227–235, 200; 370/229–231, 235, 352, 389–390; 714/15–18, 714/748; 719/318–319
See application file for complete search history.

(56) References Cited

U.S. PATENT DOCUMENTS

| 5,920,701 | A  | * | 7/1999  | Miller et al. ............. 709/228 |
| 6,151,696 | A  | * | 11/2000 | Miller et al. ............. 714/748 |
| 6,185,623 | B1 | * | 2/2001  | Bailey et al. ............. 709/238 |
| 6,389,473 | B1 | * | 5/2002  | Carmel et al. ............ 709/231 |
| 6,983,334 | B2 | * | 1/2006  | Riedle ...................... 709/250 |
| 7,051,112 | B2 | * | 5/2006  | Dawson .................... 709/232 |
| 7,051,337 | B2 | * | 5/2006  | Srikantan et al. ........ 719/318 |
| 7,065,586 | B2 | * | 6/2006  | Ruttenberg et al. ..... 709/244 |
| 7,088,678 | B1 | * | 8/2006  | Freed et al. .............. 370/230 |
| 7,301,944 | B1 | * | 11/2007 | Redmond ................. 370/390 |
| 2001/0029548 | A1 | * | 10/2001 | Srikantan et al. ..... 709/250 |
| 2003/0088667 | A1 |   | 5/2003  | Riedle |

(Continued)

FOREIGN PATENT DOCUMENTS

EP 1134950 9/2001

OTHER PUBLICATIONS

Preliminary Rejection for Korean Patent Application No. 10-2007-7022384 mailed Nov. 19, 2008, 3 pgs.

(Continued)

*Primary Examiner* — Greg Bengzon
(74) *Attorney, Agent, or Firm* — Blakely, Sokoloff, Taylor & Zafman LLP

(57) ABSTRACT

Methods and apparatuses for server side flow control. Receive a request from a first client device to multicast a file as a plurality of packets of data from a server device to multiple client device; transmit the plurality of packets of data from a server to the multiple client devices using a multicast trivial file transfer protocol (TFTP); and apply, by the server, one or more flow control techniques not defined by the multicast TFTP.

15 Claims, 6 Drawing Sheets

U.S. PATENT DOCUMENTS

| | | | |
|---|---|---|---|
| 2004/0236829 | A1 | 11/2004 | Xu et al. |
| 2004/0267960 | A1 | 12/2004 | Riedle |
| 2005/0177625 | A1* | 8/2005 | Paek et al. ............ 709/219 |
| 2007/0198737 | A1* | 8/2007 | Xu et al. ............ 709/230 |
| 2008/0168157 | A1* | 7/2008 | Marchand ............ 709/219 |

OTHER PUBLICATIONS

Preliminary Rejection for Korean Patent Application No. 10-2007-7022384 mailed Jun. 22, 2009, 2 pgs.

Supplementary European Search Report for European Patent Application No. 05 71 4794 mailed Mar. 25, 2009, 8 pgs.

Examination Report for GB Patent Application No. GB0718495.5 mailed Jul. 27, 2009, 2 pgs.

Emberson, A, "RFC 2090; TFTP Multicast Option", Network Working Group Request for Comments, Feb. 1, 1997, pp. 1-6.

Sollins, K. R., "The TFTP Protocol (Revision 2)", IETF Request for Comments, Jun. 1, 1981, pp. 1-15.

* cited by examiner

SERVER SIDE TFTP FLOW CONTROL

CROSS-REFERENCE TO RELATED APPLICATION

This application is a National Phase application of, and claims priority to, International Application No. PCT/CN2005/000263, filed Mar. 5, 2005, entitled SERVER SIDE TFTP FLOW CONTROL.

TECHNICAL FIELD

Embodiments of the invention relate to file transfer. More particularly, embodiments of the invention relate to server side flow control for the Trivial File Transfer Protocol (TFTP).

BACKGROUND

Trivial File Transfer Protocol (TFTP) is a simple file transfer protocol that operates in a lock step fashion. That is, each packet is acknowledged by a receiving client and the server does not transmit the subsequent packet until the acknowledgement is received for the previous packet. One embodiment of TFTP is described formally in Request for Comments (RFC) 1350, Rev. 2, published July 1992. Because of simplicity, TFTP is used in pre-boot environments and/or embedded systems. Typical usage may include download of an operating system loader or upgrading of a system image or BIOS.

However, as file sizes increase and/or packets are lost during transmission, the performance provided by TFTP may be unacceptable because large file sizes and repeated transmission of packets may overload network infrastructure components. Thus, TFTP may be insufficient for more complex file download conditions.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Figure 1:
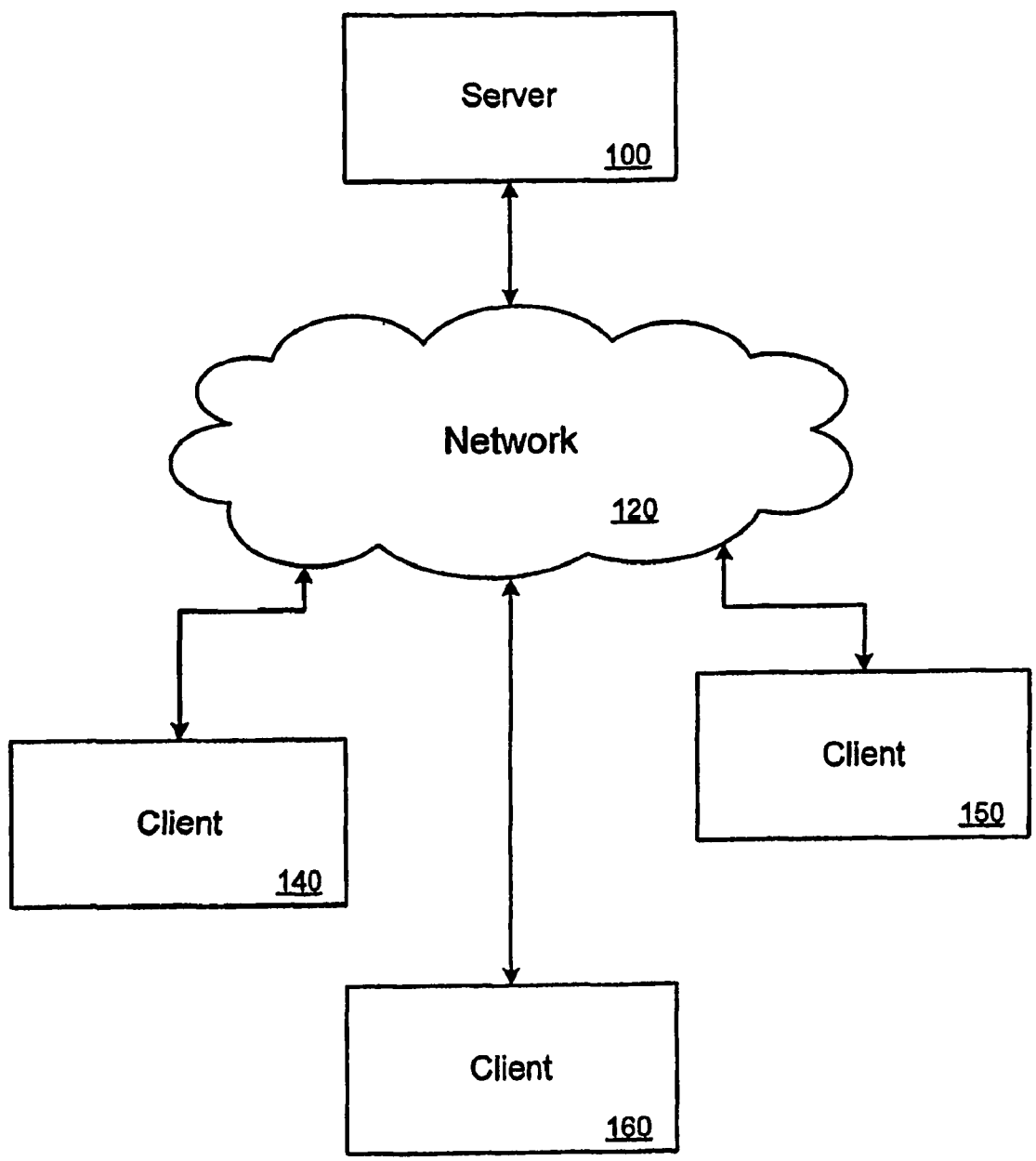
FIG. 1 is a block diagram of a network that may connect a server to multiple clients.

FIG. 1 is a block diagram of a network that may connect a server to multiple clients. Server 100 may be coupled with any number of clients (e.g., 140, 150, 160) via network 120, which operate according to any network communication protocol known in the art.

Currently the Trivial File Transfer Protocol (TFTP) may be used to transfer files between devices. In general, TFTP is a transfer protocol that is simpler to use than the File Transfer Protocol (FTP), but provides less functionality. For example, TFTP does not support user authentication or directory visibility. TFTP uses the User Datagram Protocol (UDP) rather than the Transmission Control Protocol (TCP). One embodiment of TFTP is described formally in Request for Comments (RFC) 1350, Rev. 2, published July 1992.

TFTP has been expanded to include a multicast option as described in RFC 2090, published February 1997. Multicast TFTP classifies client devices as active clients or passive clients. There is only one active client at a time. The active client communicates with a server to download data using a stop-and-wait ARQ flow and error control technique to a negotiated group address. Passive clients snoop on the download to the active client and capture data destined for the group address. When the active client finishes downloading the data, a passive client is selected as a new active client.

In one embodiment, one client, for example, client 160, may operate as an active client as defined by the multicast TFTP to request download of a file from server 100. Any number of additional clients, for example, clients 140 and 150, may operate as passive clients as defined by the multicast TFTP to receive packets corresponding to the file requested by the active client. Upon completion of the download by the active client one of the passive clients may become a new active client to download missing packets.

In the description herein, the term "packet" refers to any block of data, which can be, for example, a predefined, fixed length or variable in length. In one embodiment, a packet is defined by the multicast TFTP definition. In alternate embodiments, other packet sizes may be used.

Multicast TFTP does not define techniques for server-side flow control. In one embodiment, a multicast TFTP session may be managed by server 100 using one or more flow control techniques described herein. The TFTP standard relies on a lock-step transfer model in which every packet is acknowledged by the client device before the server transmits a subsequent packet. This does not allow the transfer rate to be controlled by the server device.

In one embodiment a passive client may join the multicast group during file download. For these passive clients, packets transmitted prior to joining the multicast group may be received when the missing packets are retransmitted to a new active client.

Figure 2:
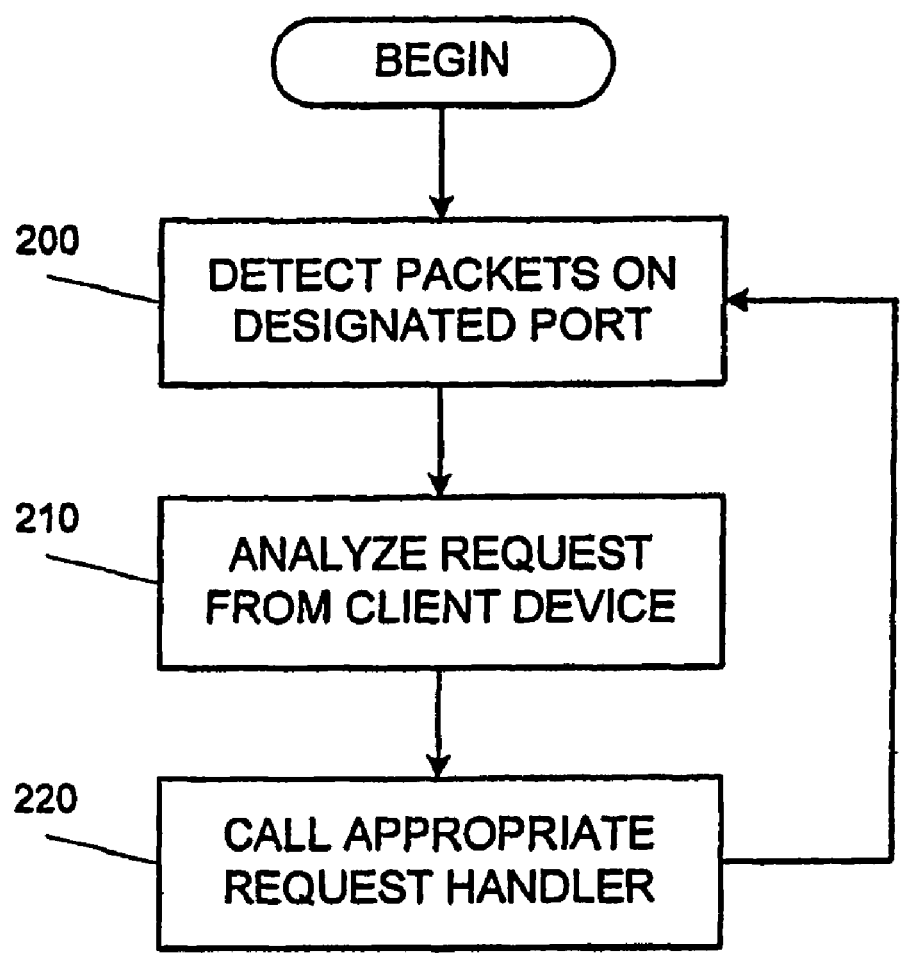
FIG. 2 is a flow chart of one embodiment of a main flow of operation of a server device that may provide server side flow control of a TFTP and/or multicast TFTP session.

FIG. 2 is a flow chart of one embodiment of a main flow of operation of a server device that may provide server side flow control of a TFTP and/or multicast TFTP session. The server may monitor a designated port to detect packets that may carry requests for download of a file, 200. In one embodiment, the server device may execute a multi-threaded application that includes one thread that monitors the designated port. The designated port may be, for example, UDP port 69 as defined by the TFTP standard; however, other ports may also be used.

When a packet is received via the designated port, the application may analyze the packet to determine whether the packet includes a request from a client device, 210. In response to a request from a client device, the application may call the appropriate request handler, 220. After calling the request handler, the application may return to monitoring the designated port. In one embodiment, at least the following three request handlers are implemented by the application and/or by another application executed by the server device: an upload request handler (FIG. 3), a unicast download request handler (FIG. 4), and a multicast download request handler (FIG. 5). In alternate embodiments, additional and/or different request handlers may be supported.

Figure 3:
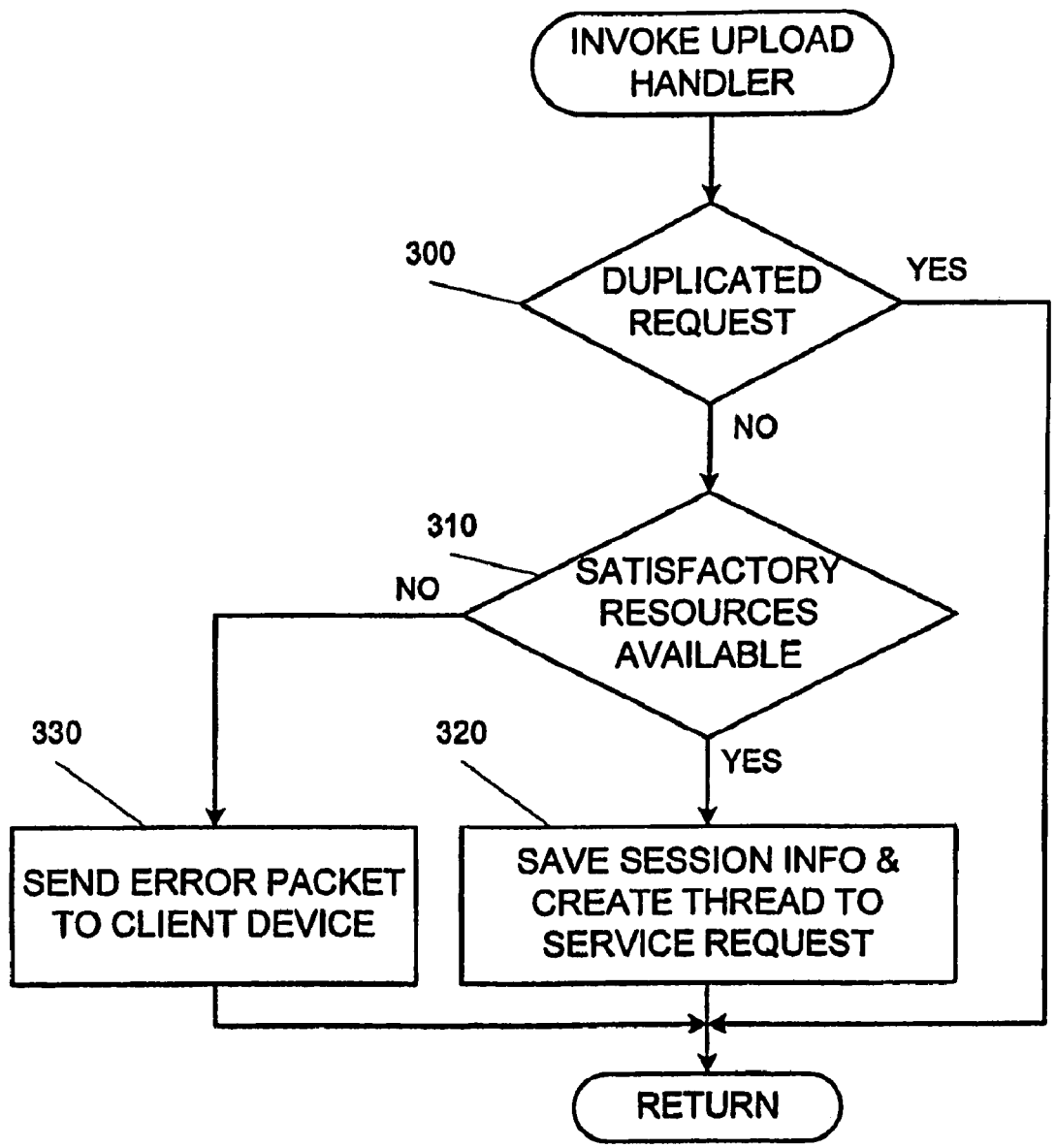
FIG. 3 is a flow chart of operation of one embodiment of an upload request handler executed by a server device that may provide server side flow control of a TFTP and/or multicast TFTP session.

FIG. 3 is a flow chart of operation of one embodiment of an upload request handler executed by a server device that may provide server side flow control of a TFTP and/or multicast TFTP session. In response to being invoked, the upload handler may determine whether the corresponding request is a duplicated request, 300. If the request is a duplicate request, the upload handler may return because the requested upload has been processed.

If the request is not a duplicate, 300, the upload request handler may determine whether the host server has satisfactory resources available to process the request, 310. If the server does not have satisfactory resources available, the upload handler may cause an error packet to be sent to the requesting client device, 330. If the server does have satisfactory resources available, the upload handler may save session information that may be used, for example, by other request handlers, and the upload request handler may create a thread to service the request, 320. Server side flow control techniques that may be used in servicing the upload request are described in greater detail below.

Figure 4:
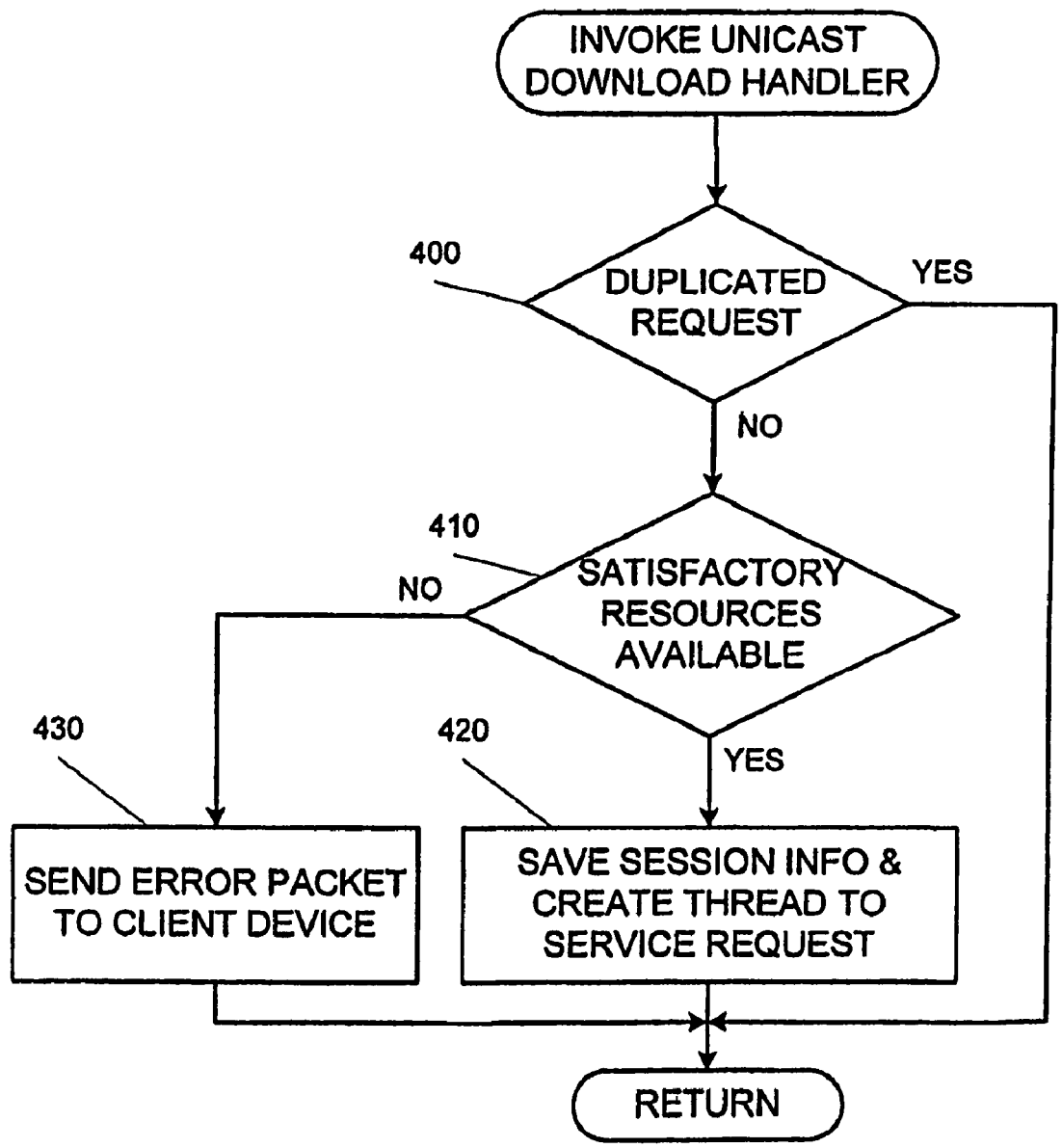
FIG. 4 is a flow chart of operation of one embodiment of a unicast download request handler executed by a server device that may provide server side flow control of a TFTP and/or multicast TFTP session.
Figure 5:
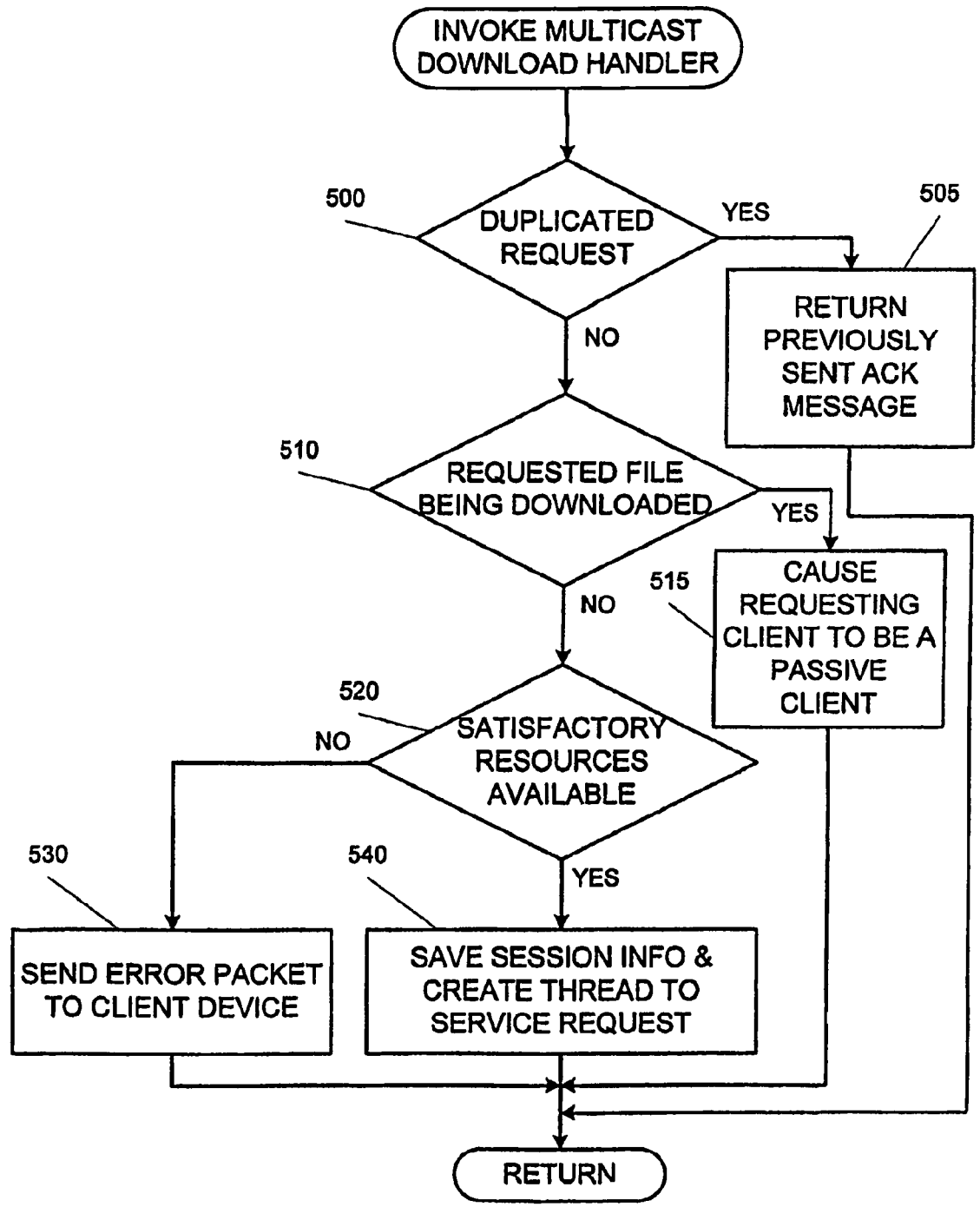
FIG. 5 is a flow chart of operation of one embodiment of a multicast download request handler executed by a server device that may provide server side flow control of a TFTP and/or multicast TFTP session.

FIG. 4 is a flow chart of operation of one embodiment of a unicast download request handler executed by a server device that may provide server side flow control of a TFTP and/or multicast TFTP session. In response to being invoked, the unicast download handler may determine whether the corresponding request is a duplicated request, 400. If the request is a duplicate request, the unicast download handler may return because the requested download has been processed.

If the request is not a duplicate, 400, the unicast download request handler may determine whether the host server has satisfactory resources available to process the request, 410. If the server does not have satisfactory resources available, the unicast download handler may cause an error packet to be sent to the requesting client device, 430. If the server does have satisfactory resources available, the unicast download handler may save session information that may be used, for example, by other request handlers, and the unicast download request handler may create a thread to service the request, 420. Server side flow control techniques that may be used in servicing the unicast download request are described in greater detail below.

FIG. 5 is a flow chart of operation of one embodiment of a multicast download request handler executed by a server device that may provide server side flow control of a TFTP and/or multicast TFTP session. In response to being invoked, the multicast download handler may determine whether the corresponding request is a duplicated request, 500. If the request is a duplicate request, the multicast download handler may return a previously sent acknowledge message to the requesting client device, 505. The acknowledge message may cause the requesting client device to operate as a passive client in the multicast download session.

If the request is not a duplicate, 500, the multicast download request handler may determine whether another multicast group is downloading the requested file, 510. If the requested file is being downloaded, the multicast download handler causes the requesting client to become a passive client in the existing multicast download group, 515.

If the requested file is not being downloaded by another multicast group, 510, the multicast download hander may determine whether the host server has satisfactory resources available to process the request, 520. If the server does not have satisfactory resources available, the multicast download handler may cause an error packet to be sent to the requesting client device, 530. If the server does have satisfactory resources available, the multicast download handler may save session information that may be used, for example, by other request handlers, and the multicast download request handler may create a thread to service the request, 540. Server side flow control techniques that may be used in servicing the unicast download request are described in greater detail below.

In one embodiment, to save session information, an application running on the server may maintain three linked lists (or other suitable data structures) to save information related to upload sessions, unicast download sessions and multicast download sessions. A request handler may then traverse one or more of the linked lists to determine whether the current request is a duplicate request and/or if the file is being downloaded. This may allow the server to combine download sessions where appropriate.

In one embodiment, one or more request handlers monitor host system resources to determine whether sufficient resources are available to process a request. The resources may include, for example, network bandwidth, host computing capacity, memory usage, number of active threads, etc. The resource criterion may be different for different request handlers. As an example, if the block size of a request is L and the bandwidth of the server connection is B, then a new request may be required to satisfy $$\Sigma(L/B) \leq \frac{1}{2},$$

which would allow each active session to send at least one packet every half second, Other criterion may also be used.

In one embodiment, the server may monitor packet loss rate and adjust the packet transmission rate based, at least in part, on the packet loss rate. For example, a transmission delay may be computer according to:

```
If (packet is lost){
    If(send delay is zero){
        Set send delay to 1
    } else if(send delay > timeout/4){
        Set send delay to timeout/4
    }
    Double send delay
}else{
    decrease send delay by 1 every 10 successfully received packets
    until 0
}
```

Other delay computations may also be used.

Figure 6:
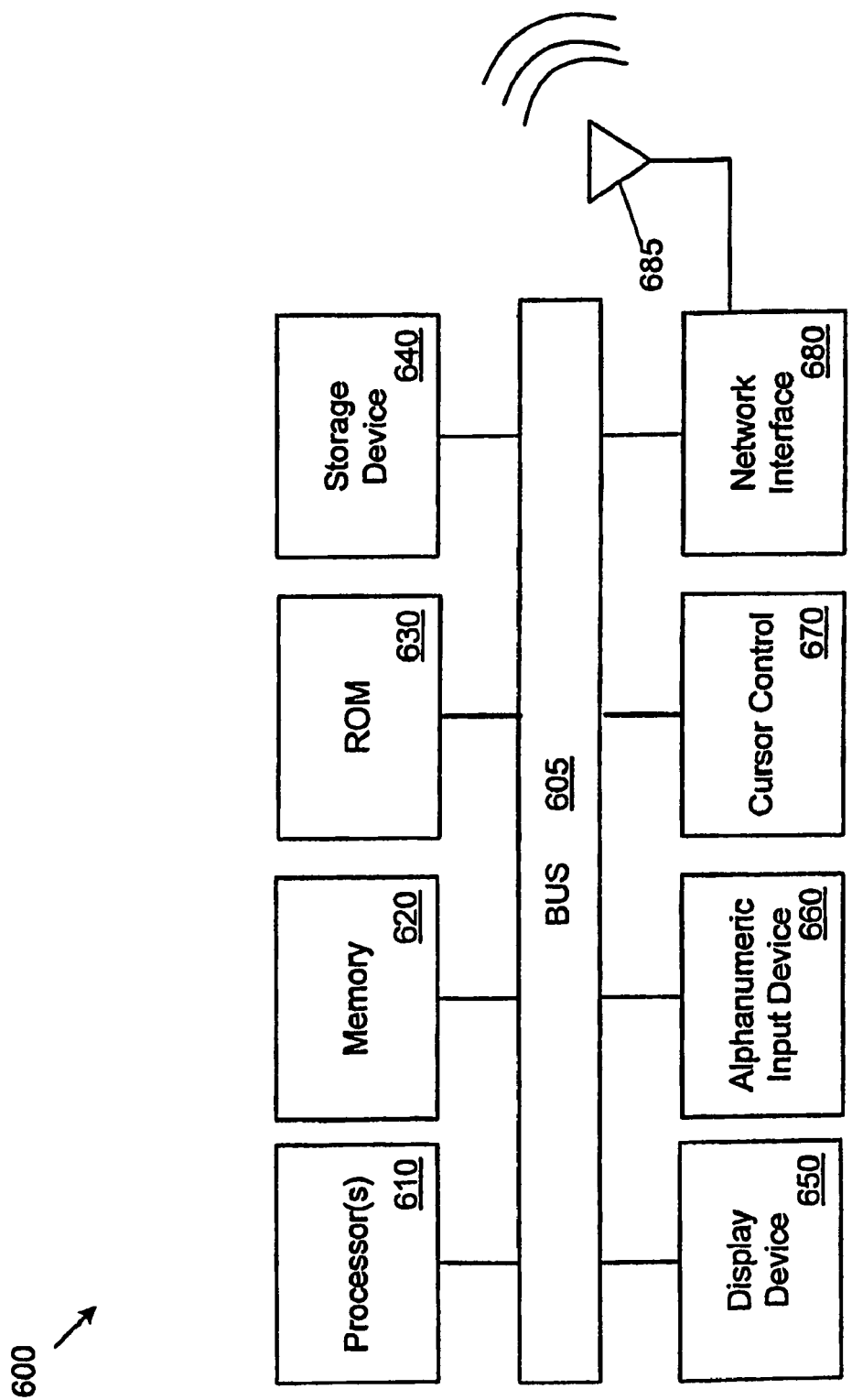
FIG. 6 is a block diagram of one embodiment of an electronic system.

In one embodiment, the techniques of FIGS. 2-5 can be implemented as instructions executed by an electronic system. The instructions may be stored by the electronic device or the instructions can be received by the electronic device (e.g., via a network connection). FIG. 6 is a block diagram of one embodiment of an electronic system. The electronic system illustrated in FIG. 6 is intended to represent a range of electronic systems, for example, computer systems, network access devices, etc. Alternative systems, whether electronic or non-electronic, can include more, fewer and/or different components. The electronic system of FIG. 6 may represent a server device as well as the one or more client devices.

Electronic system 600 includes bus 605 or other communication device to communicate information, and processor 610 coupled to bus 605 to process information. While electronic system 600 is illustrated with a single processor, electronic system 600 can include multiple processors and/or co-processors. Electronic system 600 further includes random access memory (RAM) or other dynamic storage device 620 (referred to as memory), coupled to bus 605 to store information and instructions to be executed by processor 610. Memory 620 also can be used to store temporary variables or other intermediate information during execution of instructions by processor 610.

Electronic system 600 also includes read only memory (ROM) and/or other static storage device 630 coupled to bus 605 to store static information and instructions for processor 610. In one embodiment, static storage device 630 may include an embedded firmware agent that may have an interface compliant with an Extensible Firmware Interface (EFI) as defined by the EFI Specifications, version 1.10, published Nov. 26, 2003, available from Intel Corporation of Santa Clara, Calif. In alternate embodiments, other firmware components can also be used.

Data storage device 640 is coupled to bus 605 to store information and instructions. Data storage device 640 such as a magnetic disk or optical disc and corresponding drive can be coupled to electronic system 600.

Electronic system 600 can also be coupled via bus 605 to display device 650, such as a cathode ray tube (CRT) or liquid crystal display (LCD), to display information to a user. Alphanumeric input device 660, including alphanumeric and other keys, is typically coupled to bus 605 to communicate information and command selections to processor 610. Another type of user input device is cursor control 670, such as a mouse, a trackball, or cursor direction keys to communicate direction information and command selections to processor 610 and to control cursor movement on display 650. Electronic system 600 further includes network interface 680 to provide access to a network, such as a local area network. Network interface 680 may further include one or more antennae 685 to provide a wireless network interface according to any protocol known in the art.

Instructions are provided to memory from a storage device, such as magnetic disk, a read-only memory (ROM) integrated circuit, CD-ROM, DVD, via a remote connection (e.g., over a network via network interface 680) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

An electronically-accessible medium includes any mechanism that provides (i.e., stores) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; etc.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
executing, by a server device, a multi-threaded application having at least one thread to monitor a port of the server device for received requests from a plurality of client devices;
executing, by the server device, at least three request handlers to manage any of the received requests from the plurality of client devices, the at least three request handlers comprising an upload request handler, a multicast download request handler and a unicast download request handler;
detecting, by the server device, that a multicast request is received from a first client device of the plurality of client devices;
invoking, by the server device, the multicast download request handler in order to save session information regarding the received multicast request and create another thread of the multi-threaded application to service the received multicast request;
wherein servicing the received multicast request by the another thread further comprises:
transmitting the plurality of packets of data from the server device to the multiple client devices using a multicast trivial file transfer protocol (TFTP) as a TFTP-compliant flow; and
applying one or more flow control techniques not defined by the multicast TFTP to the TFTP-compliant flow, wherein the flow control techniques comprise determining whether the server device has sufficient resources to satisfy the request based on a block size corresponding to the request and an available bandwidth, and sending an error packet to the first client device if the server device does not have sufficient resources to satisfy the request, wherein applying, by the server, one or more flow control techniques not defined by multicast TFTP comprise delaying a start of the transmission of the plurality of packets, wherein delaying includes if a packet is lost and a send delay is determined to be zero, the send delay of zero is set to one, and if the send delay is determined to be greater than timeout/four, the send delay is set equal to the timeout/four, wherein the send delay is doubled or the send delay is decreased by one for a number of successful packets received until the send delay reaches zero, wherein the number of successful packets received includes ten.

2. The method of claim 1 wherein applying, by the server, one or more flow control techniques not defined by multicast TFTP comprises:
determining whether a request to download the file is a subject of an existing multicast download session; and
causing the multiple client devices to join an existing multicast group corresponding to the existing multicast download session.

3. The method of claim 1 wherein applying, by the server, one or more flow control techniques not defined by multicast TFTP comprises modifying quality of service based, at least in part, on resource conditions.

4. The method of claim 3 wherein modifying the quality of service comprises one or more of: modifying block size and modifying timeout length.

5. The method of claim 1 wherein applying, by the server, one or more flow control techniques not defined by multicast TFTP comprises reducing a packet transmission rate.

6. The method of claim 1 wherein applying, by the server, one or more flow control techniques not defined by multicast TFTP comprises retransmitting a most recently transmitted packet in response to receiving an unexpected packet.

7. A server device comprising:
a network interface to receive messages from a plurality of client devices including requests to download a file stored by the server device;
a memory coupled with the network interface to store the file; and
a processor coupled with the memory and the network interface, the processor configured to:
execute a multi-threaded application having at least one thread to monitor a port of the server device for received requests from the plurality of client devices;
execute at least three request handlers to manage any of the received requests from the plurality of client devices, the at least three request handlers comprising an upload request handler, a multicast download request handler and a unicast download request handler;
detect that a multicast request is received from a first client device of the plurality of client devices;
invoke the multicast download request handler in order to save session information regarding the received multicast request and create another thread of the multi-threaded application to service the received multicast request;
wherein servicing the received multicast request by the another thread further comprises the processor to:
transmit the plurality of packets of data from the server device to the one or more client devices using a multicast trivial file transfer protocol (TFTP) as a TFTP-compliant flow; and
apply one or more flow control techniques not defined by the multicast TFTP to the TFTP-compliant flow, wherein the flow control techniques comprise determining whether the server device has sufficient resources to satisfy the request based on a block size corresponding to the request and an available bandwidth, and sending an error packet to the first client device if the server device does not have sufficient resources to satisfy the request, wherein applying, by the server, one or more flow control techniques not defined by multicast TFTP comprise delaying a start of the transmission of the plurality of packets, wherein delaying includes if a packet is lost and a send delay is determined to be zero, the send delay of zero is set to one, and if the send delay is determined to be greater than timeout/four, the send delay is set equal to the timeout/four, wherein the send delay is doubled or the send delay is decreased by one for a number of successful packets received until the send delay reaches zero, wherein the number of successful packets received includes ten.

8. The server of claim 7 wherein the one or more flow control techniques not defined by multicast TFTP comprises determining whether a request to download the file is a subject of an existing multicast download session, and causing the multiple client devices to join an existing multicast group corresponding to the existing multicast download session.

9. The server of claim 7 wherein the one or more flow control techniques not defined by multicast TFTP comprises modifying quality of service based, at least in part, on resource conditions.

10. The server of claim 9 wherein modifying the quality of service comprises one or more of: modifying block size and modifying timeout length.

11. The server of claim 7 wherein the one or more flow control techniques not defined by multicast TFTP comprises reducing a packet transmission rate.

12. A non-transitory computer-readable medium having stored thereon instructions that, when executed by one or more processors, cause the one or more processors to:
execute a multi-threaded application having at least one thread to monitor a port of a server device for received requests from a plurality of client devices;
execute at least three request handlers to manage any of the received requests from the plurality of client devices, the at least three request handlers comprising an upload request handler, a multicast download request handler and a unicast download request handler;
detect that a multicast request is received from a first client device of the plurality of client devices;
invoke the multicast download request handler in order to save session information regarding the received multicast request and create another thread of the multi-threaded application to service the received multicast request;
wherein servicing the received multicast request by the another thread further comprises the server device to:
transmit the plurality of packets of data from the server device to the multiple client devices using a multicast trivial file transfer protocol (TFTP) as a TFTP-compliant flow; and
apply one or more flow control techniques not defined by the multicast TFTP to the TFTP-compliant flow, wherein the flow control techniques comprise determining whether the server device has sufficient resources to satisfy the request based on a block size corresponding to the request and an available bandwidth, and sending an error packet to the first client device if the server device does not have sufficient resources to satisfy the request, wherein applying, by the server, one or more flow control techniques not defined by multicast TFTP comprise delaying a start of the transmission of the plurality of packets, wherein delaying includes if a packet is lost and a send delay is determined to be zero, the send delay of zero is set to one, and if the send delay is determined to be greater than timeout/four, the send delay is set equal to the timeout/four, wherein the send delay is doubled or the send delay is decreased by one for a number of successful packets received until the send delay reaches zero, wherein the number of successful packets received includes ten.

13. The medium of claim 12 wherein the instructions that cause the one or more processors to apply, by the server, one or more flow control techniques not defined by multicast TFTP comprise instructions that, when executed, cause the one or more processors to:
determine whether a request to download the file is a subject of an existing multicast download session; and
cause the multiple client devices to join an existing multicast group corresponding to the existing multicast download session.

14. The medium of claim 12 wherein the instructions that cause the one or more processors to apply, by the server, one or more flow control techniques not defined by multicast TFTP comprise instructions that, when executed, cause the one or more processors to modify quality of service based, at least in part, on resource conditions.

15. The medium of claim 12 wherein the instructions that cause the one or more processors to apply, by the server, one or more flow control techniques not defined by multicast TFTP comprise instructions that, when executed, cause the one or more processors to reduce a packet transmission rate.

* * * * *